United States Patent
Yang et al.

(10) Patent No.: US 8,700,098 B2
(45) Date of Patent: Apr. 15, 2014

(54) MOBILE TERMINAL

(75) Inventors: Seungsu Yang, Gyeonggi-Do (KR);
Kwonjin Kang, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 153 days.

(21) Appl. No.: 13/354,212

(22) Filed: Jan. 19, 2012

(65) Prior Publication Data

US 2012/0276957 A1    Nov. 1, 2012

(30) Foreign Application Priority Data

Apr. 29, 2011    (KR) .......................... 10-2011-0041094

(51) Int. Cl.
*H04B 1/38*    (2006.01)
(52) U.S. Cl.
USPC ......... 455/566; 455/333; 455/575.1; 345/173
(58) Field of Classification Search
USPC ............. 455/550.1, 566, 575.1, 333; 345/173
See application file for complete search history.

(56) References Cited

U.S. PATENT DOCUMENTS

2004/0189563 A1*  9/2004  Wu et al. .......................... 345/87
2011/0072345 A1*  3/2011  Lim ............................... 715/702

* cited by examiner

*Primary Examiner* — Nhan Le
(74) *Attorney, Agent, or Firm* — Birch, Stewart, Kolasch & Birch, LLP (57) ABSTRACT

A mobile terminal includes a terminal body; a window coupled to the terminal body, including a display region for displaying an image, and including a print region which encompasses the display region; a display unit including a display panel disposed in the terminal body and having a first touch detection layer therein, and including a driver integrated circuit (IC) mounted to the display panel so as to face the print region of the window; and a second touch detection layer formed on the print region of the window facing the driver IC, and configured to detect a touch signal. The mobile terminal may have a small size and an enhanced design.

20 Claims, 10 Drawing Sheets

MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2011-0041094, filed on Apr. 29, 2011 the contents of which is incorporated by reference herein in its entirety.

BACKGROUND OF THE INVENTION

1. Field of the Invention

The present invention relates to a mobile terminal.

2. Description of Related Art

A mobile terminal may be classified into a portable terminal and a stationary terminal according to a moveable state. The mobile terminal is a device that can be carried around and has one or more functions such as to perform voice and video call communications, inputting and outputting information, storing data, and the like.

Recently, as functions of the mobile terminal become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

The mobile terminal may be classified into a mobile terminal and a stationary terminal according to a moveable state. The mobile terminal is a device that can be carried around and has one or more functions such as to perform voice and video call communications, inputting and outputting information, storing data, and the like.

Various attempts have been made to implement complicated functions in such a multimedia device by means of hardware or software.

When an Oncell type or Incell type display panel having a display function and a touch function in an integrated manner is applied to the mobile terminal, a touch operation is implemented only on a display region (region where an image is displayed).

Accordingly, in case of implementing a touch key function on a region rather than the display region, a touch sensor module has to be additionally mounted at the outer periphery of the display region.

However, due to a thick thickness, the touch sensor module cannot be mounted at a space above a region where a driver integrated circuit (IC) is disposed. Rather, an additional space for mounting the touch sensor module has to be obtained outside the display region.

This makes the mobile terminal to have a large size, and causes an idle space (non-utilizable space) above the driver-IC.

It is preferable to design the mobile terminal such that a distance between the display region and an additional touch key is short. However, the conventional mobile terminal has not implemented a sophisticated design due to limitations in shortening a distance between the display region and an additional touch key.

Due to the non-utilizable space above the driver-IC, the mobile terminal has a large size and a degraded design. This may require improvements.

BRIEF SUMMARY OF THE INVENTION

Therefore, an aspect of the detailed description is to provide a mobile terminal capable of having a small size and an enhanced design by narrowing a gap between a display region and a touch key, by implementing the touch key on a window positioned above a driver integrated circuit (IC) of a display panel having an integrated touch function.

To achieve these and other advantages and in accordance with the purpose of this specification, as embodied and broadly described herein, there is provided a mobile terminal, comprising: a terminal body; a window coupled to the terminal body, including a display region for displaying an image, and including a print region which encompasses the display region; a display unit including a display panel disposed in the terminal body and having a first touch detection layer therein, and including a driver IC mounted to the display panel so as to face the print region of the window; and a second touch detection layer formed on the print region of the window facing the driver IC, and configured to detect a touch signal.

The display unit of the mobile terminal may include a first substrate; a second substrate facing the first substrate, formed to be longer than the first substrate, and having a driver IC mounted thereon; and a first touch detection layer formed on the first substrate.

The mobile terminal may further comprise a first signal transmitting unit connected to the first touch detection layer, and configured to transmit a touch signal detected by the first touch detection layer.

The mobile terminal may further comprise a second signal transmitting unit connected to the second touch detection layer, and configured to transmit a touch signal detected by the second touch detection layer.

The mobile terminal may further comprise a third signal transmitting unit connected to the second substrate, and configured to transmit a signal generated from the display panel or to transmit a signal to the display panel.

At least one of the first to third signal transmitting units may be implemented as a Flexible Printed Circuit Board (FPCB).

The second signal transmitting unit may be implemented as a connecting electrode formed at the terminal body, and electrically connected to a main board.

The first to third signal transmitting units may be connected to the main board separately, or in a manner that at least two signal transmitting units are integrated with each other.

The first to third signal transmitting units may be connected to the main board by a connector or by soldering.

The display unit of the mobile terminal may include a first substrate; a second substrate facing the first substrate, formed to be longer than the first substrate, and having a driver IC mounted thereon; and a second touch detection layer formed between the first and second substrates.

Part of the print region of the window may be implemented as a touch key forming region having a specific shape, and the second touch detection layer may be formed on the touch key forming region.

A light emitting device may be mounted to the second signal transmitting unit, and a light guiding layer configured to transmit light generated from the light emitting device to the touch key forming region may be formed on the second touch detection layer.

In the mobile terminal, the second touch detection layer may be spacing from one surface of the display region of the window in a length direction.

The mobile terminal may further comprise a third touch detection layer electrically connected to the second touch detection layer, and spacing from another surface of the display region of the window in a length direction.

In the mobile terminal, the third touch detection layer may operate as a hot key.

The mobile terminal may further comprise a fourth touch detection layer electrically connected to the second touch detection layer, and spacing from one surface of the display region of the window in a width direction.

In the mobile terminal, the fourth touch detection layer may operate as a scroll key.

The mobile terminal may further comprise a second signal transmitting unit connected to the third touch detection layer, and configured to transmit a touch signal detected by at least one of the second to fourth touch detection layers.

In the mobile terminal, the second to fourth touch detection layers may be electrically connected to one another by a routing electrode formed on the print region of the window.

The display panel of the mobile terminal may include an image display layer configured to display an image, and a first touch detection layer configured to detect a user's touch.

According to another aspect of the present invention, there is provided a mobile terminal, comprising: a terminal body having a window; a display unit disposed in the terminal body, including a first substrate, a second substrate facing the first substrate, the second substrate formed to be longer than the first substrate and having a driver integrated circuit (IC) mounted thereon so as to face the window, and a first touch detection layer formed on the first substrate or between the first and second substrates; and a second touch detection layer formed on a region of the window facing the driver IC, and configured to detect a touch signal.

In the present invention, a gap between a display region and a touch key may be narrowed by implementing the touch key on a window positioned above the driver IC of the display unit. This may allow the mobile terminal to have a small size and an enhanced design.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention. In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present disclosure will be explained in more detail with reference to the attached drawings The suffixes attached to components of the mobile terminal, such as 'module' and 'unit or portion' were used for facilitation of the detailed description of the present disclosure. Therefore, the suffixes do not have different meanings from each other. The same reference numerals will be given to the same components as those of the aforementioned embodiment, and their explanations will be omitted. The singular expression of the present disclosure may include a plural concept unless distinctively differently defined.

The mobile terminal according to the present disclosure may include a portable phone, a smart phone, a laptop computer, a digital broadcasting terminal, Personal Digital Assistants (PDA), Portable Multimedia Player (PMP), a navigation system, etc., and a fixed terminal such as a digital TV, a desktop computer, etc.

Figure 1:
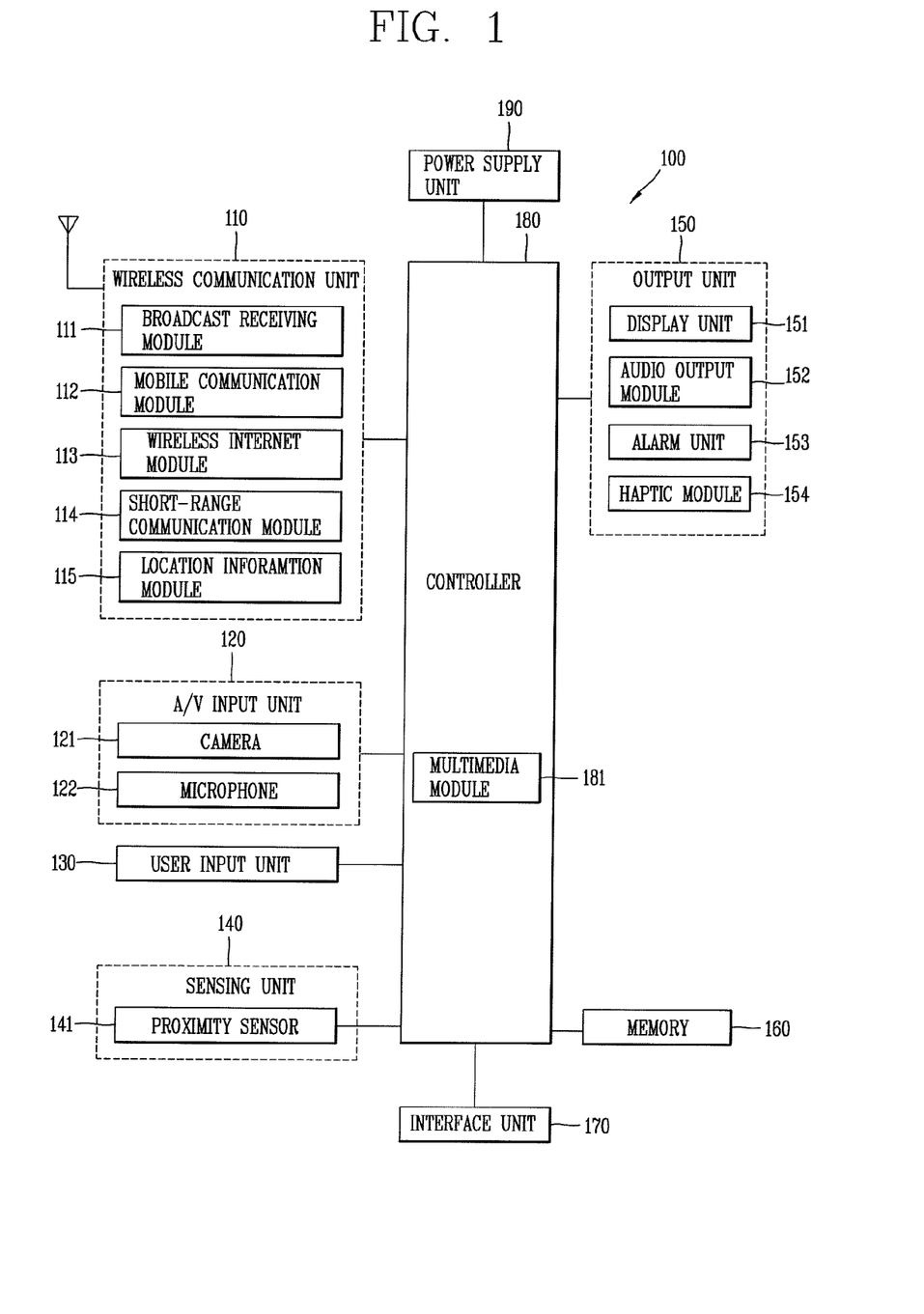
FIG. 1 is a block diagram of a mobile terminal according to a first embodiment of the present invention.

FIG. 1 is a block diagram of a mobile terminal according to one embodiment of the present disclosure.

The mobile terminal 100 may comprise components, such as a wireless communication unit 110, an Audio/Video (A/V) input unit 120, a user input unit 130, a sensing unit 140, an output module 150, a memory 160, an interface unit 170, a controller 180, a power supply unit 190 and the like.

FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives a broadcast signal and/or broadcast associated information from an external broadcast managing entity via a broadcast channel.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile communication terminal. For example, the location information module 115 may include a GPS (Global Positioning System) module.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile terminal covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display unit 151 or the audio output module 152. Accordingly, the display unit 151 or the audio output module 152 may be classified as a part of the alarm unit 153.

The haptic module 154 generates various tactile effects which a user can feel. A representative example of the tactile effects generated by the haptic module 155 includes vibration. Vibration generated by the haptic module 155 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2:
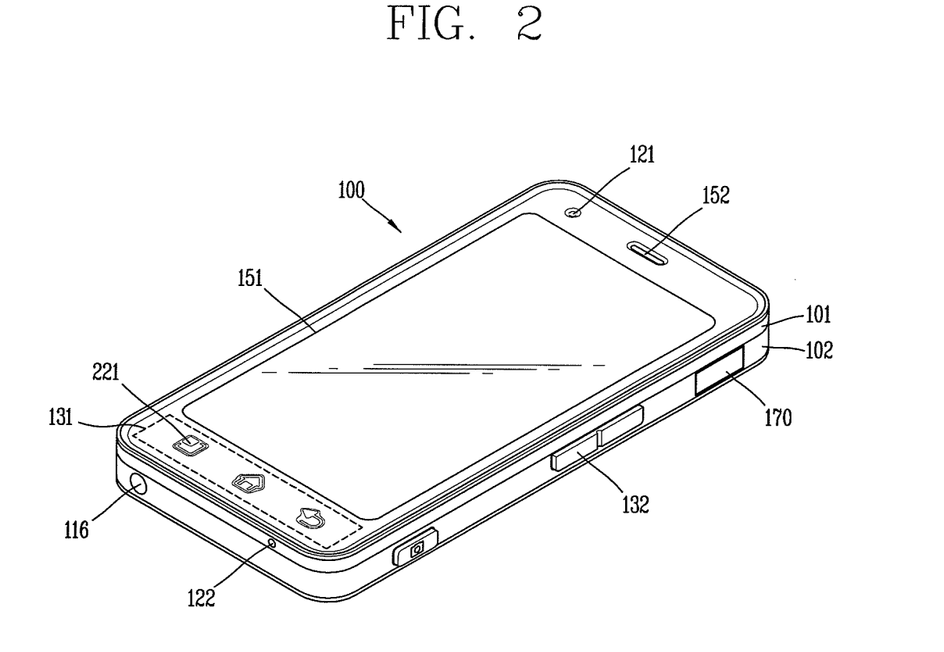
FIG. 2 is a front perspective view of a mobile terminal according to a first embodiment of the present invention.

FIG. 2 is a front perspective view of the mobile terminal according to the present invention.

The mobile terminal 100 is a bar type mobile terminal. However, the present disclosure is not limited to this, but may be applied to a slide type in which two or more bodies are coupled to each other so as to perform a relative motion, a folder type, or a swing type, a swivel type and the like.

A case (casing, housing, cover, etc.) forming an outer appearance of a body may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti).

At the front case 101, may be disposed a display unit 151, an audio output unit 152, a camera 121, user input units 130/131 and 132, a microphone 122, an interface unit 170, etc.

The display unit 151 occupies most parts of a main surface of the front case 101. The audio output unit 152 and the camera 121 are arranged at a region adjacent to one end of the display unit 151, and the user input unit 131 and the microphone 122 are arranged at a region adjacent to another end of the display unit 151. The user input unit 132, the interface unit 170, etc. may be arranged on side surfaces of the front case 101 and the rear case 102.

The user input unit 130 is manipulated to receive a command for controlling the operation of the mobile terminal 100, and may include a plurality of manipulation units 131 and 132. The manipulation units 131 and 132 may be referred to as manipulating portions, and may include any type of ones that can be manipulated in a user's tactile manner.

Commands inputted through the first or second user input units 131 and 132 may be variously set. For instance, the first manipulation 131 is configured to input commands such as START, END, SCROLL or the like, and the second manipulation unit 132 is configured to input commands for controlling a level of sound outputted from the audio output unit 152, or commands for converting the current mode of the display unit 151 to a touch recognition mode.

Figure 3:
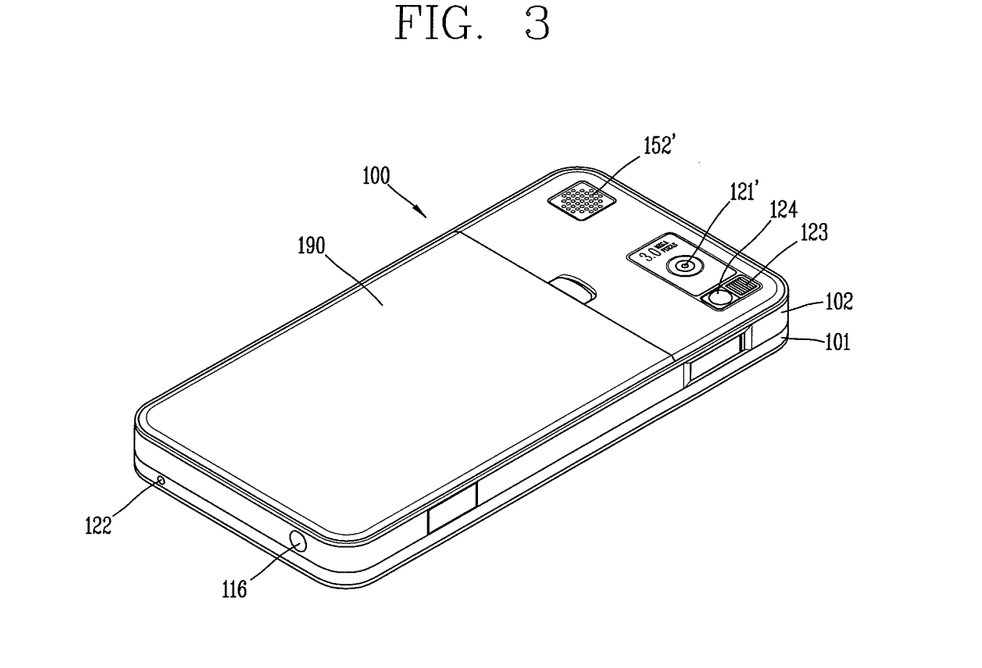
FIG. 3 is a rear perspective view of a mobile terminal according to a first embodiment of the present invention.

FIG. 3 is a rear perspective view of the mobile terminal of FIG. 1.

Referring to FIG. 3, a camera 121' may be additionally provided on the rear case 102. The camera 121' faces a direction which is opposite to a direction faced by the camera 121, and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be installed at a terminal body so as to rotate or pop-up.

A flash 123 and a mirror 124 may be additionally disposed adjacent to the camera 121'. The flash 123 operates in conjunction with the camera 121' when taking a picture using the camera 121'. The mirror 124 can cooperate with the camera 121' to allow a user to photograph himself or herself in a self-portrait mode.

An audio output unit 152' may be additionally arranged on a rear surface of the terminal body. The audio output unit 152' may cooperate with the audio output unit 152 (refer to FIG. 2) disposed on a front surface of the terminal body so as to implement a stereo function. Also, the audio output unit 152' may be configured to operate as a speakerphone.

A broadcast signal receiving antenna 116 as well as an antenna for calling may be disposed on a side surface of the terminal body. The broadcast signal receiving antenna 116 which constitutes a part of a broadcasting receiving module 111 (refer to FIG. 1) may be configured to retract into the terminal body.

A power supply unit 190 for supplying power to the mobile terminal 100 is mounted to the terminal body. The power supply unit 190 may be mounted in the terminal body, or may be configured to be detachable from the outside of the terminal body.

A touch pad for detecting touch may be additionally mounted to the rear case 102. The touch pad may be also configured to be transmissive like the display unit 151. When the display unit 151 is configured to output visual information from two surfaces, the visual information may be recognized even through the touch pad. The visual information output from the two surfaces of the display unit 151 may be controlled by the touch pad. A display may be additionally mounted to the touch pad, and a touch screen may be arranged at the rear case 102.

The touch pad interworks with the display unit 151 of the front case 101. The touch pad may be arranged at a rear side of the display unit 151 in parallel. This touch pad may have a size equal to or smaller than that of the display unit 151.

Figure 4:
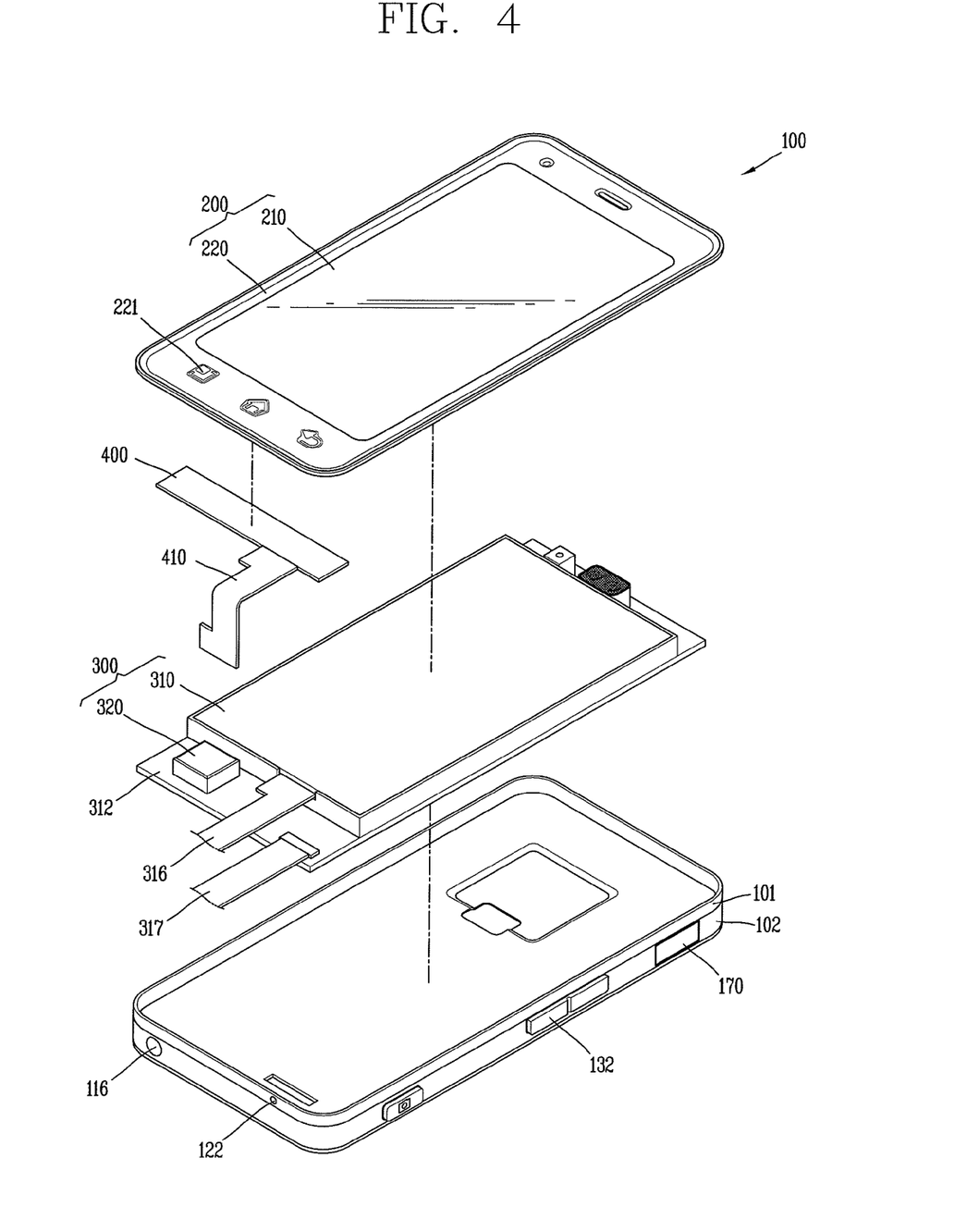
FIG. 4 is an exploded perspective view of the mobile terminal of FIG. 2.
Figure 5:
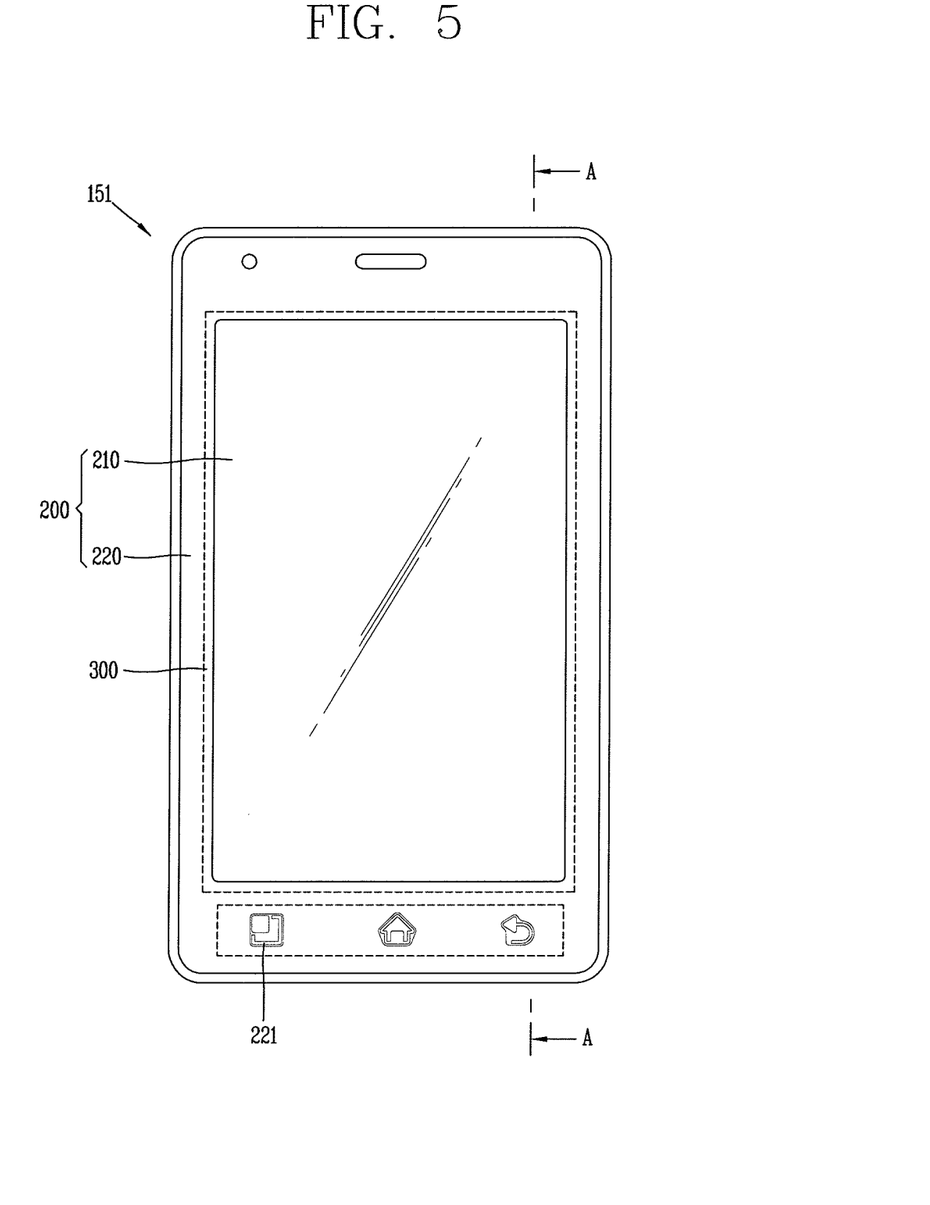
FIG. 5 is a planar view of the mobile terminal of FIG. 4.
Figure 6:
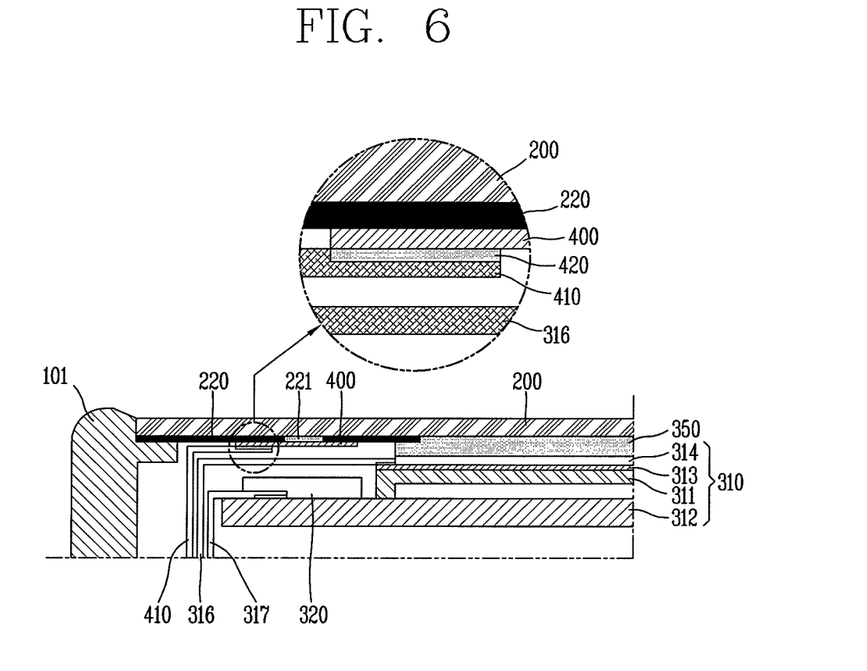
FIG. 6 is a sectional view illustrating one example of a sectional surface taken along line 'A-A' in FIG. 5.

FIG. 4 is an exploded perspective view of the mobile terminal of FIG. 2, FIG. 5 is a planar view of the mobile terminal of FIG. 4, and FIG. 6 is a sectional view illustrating one example of a sectional surface taken along line 'A-A' in FIG. 5.

Referring to FIGS. 4 to 6, the mobile terminal according to one embodiment of the present invention comprises terminal bodies 101 and 102, a window 200, a display unit 300 having a first touch detection layer 313, and a second touch detection layer 400 formed on the window 200.

The terminal bodies 101 and 102 consist of an upper case 101 and a lower case 102, which constitute the appearance of the mobile terminal.

The window 200 is coupled to the upper case 101, and is provided with a display region 210 and a print region 220.

The display region 210 is formed to be transparent such that an image displayed on the display unit 300 is viewable. And, the print region 220 is formed to be opaque, and to encompass the display region 210.

Part of the print region 220 of the window 200 may be formed as a touch key forming region 221 having a specific shape such as a decorative pattern or style, and the touch key forming region 221 may be used as a touch key.

The display unit 300 includes a display panel 310 disposed in the terminal bodies 101 and 102 and having a first touch detection layer 313 formed therein, and a driver IC 320 mounted on the display panel 310 so as to face the print region 220 of the window 200.

The display panel 310 having the touch detection layer 313 formed therein largely includes an Oncell type display panel, and an Incell type display panel.

Figure 7:
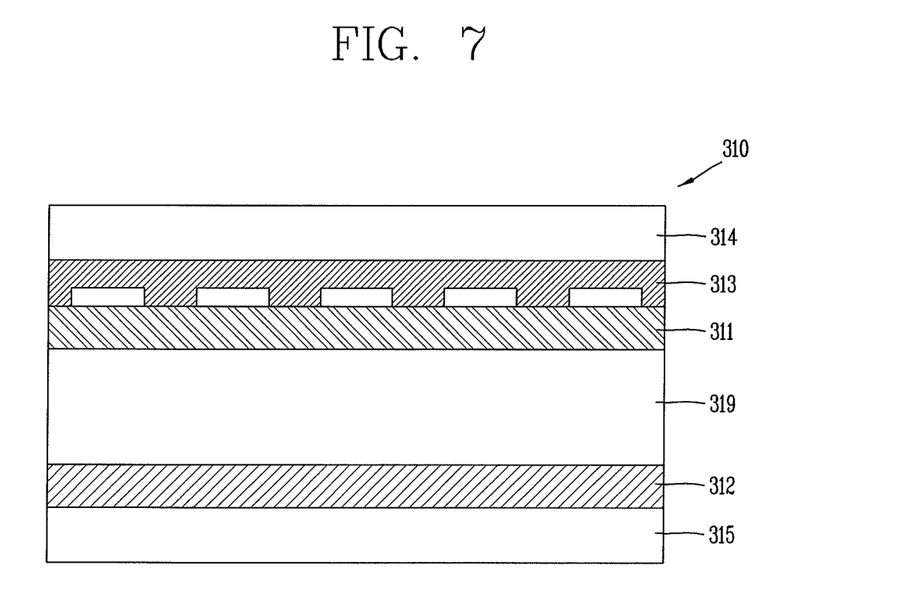
FIG. 7 is a view illustrating one example of a structure of an Oncell type display panel.
Figure 8:
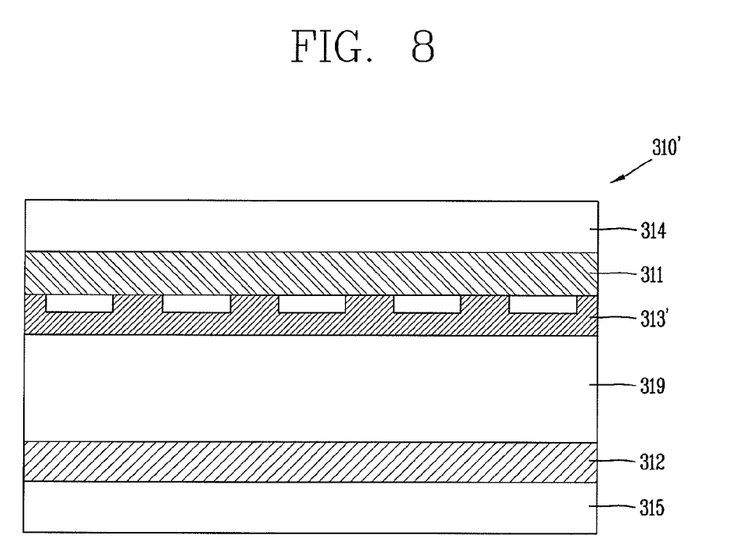
FIG. 8 is a view illustrating one example of a structure of an Incell type display panel.

FIG. 7 is a view illustrating one example of a structure of an Oncell type display panel, and FIG. 8 is a view illustrating one example of a structure of an Incell type display panel.

Referring to FIG. 7, the Oncell type display panel has a structure in which an image display layer 316 such as a liquid crystal layer or a light emitting layer is formed between an upper glass 311 and a lower glass 312, and an upper polarizing layer 314 and a lower polarizing layer 315 are formed on outer sides of the upper glass 311 and the lower glass 312, respectively.

A touch detection layer 313 having a resistant film type or a digital capacitance type is formed between the upper polarizing layer 314 and the upper glass 311.

The touch detection layer 313 may be bonded to the upper glass 311 by an optical transparent adhesive (e.g., optical clear adhesive (OCA)), or may be deposited on the upper glass 311 by using a vacuum thin film deposition technique.

The Incell type display panel has a similar structure to the Oncell type display panel. As shown in FIG. 8, a touch detection layer 313' configured to perform a touch function is formed between the upper glass 311 and the lower glass 312 of the display panel.

More concretely, the Incell type display panel has a structure that the touch detection layer 313' is formed between the upper glass 311 and the lower glass 312 where the image display layer 316 is formed.

The Oncell type display panel and the Incell type display panel may be applied to an LCD panel and an OLED panel as follows.

More concretely, the display panel applied to an LCD panel and an OLED panel may be categorized into an Oncell type or an Incell type as follows.

In case of an LCD panel, when the touch detection layer 313 is formed between the upper glass 311 and the lower glass 312 where a liquid crystal layer is formed, this may be referred to as an Incell display panel. On the other hand, when the touch detection layer 313 is formed between the upper glass 311 and the upper polarizing plate 314, this may be referred to as an Oncell display panel.

In case of an OLED panel, when the touch detection layer 313 is patterned at an inner side of the upper glass 311, this may be referred to as an Incell display panel. On the other hand, when the touch detection layer 313 is patterned at an outer side of the upper glass 311, this may be referred to as an Oncell display panel.

Referring to FIG. 6, the display unit 300 includes a first substrate 311, a second substrate 312, a first touch detection layer 313 and an upper polarizing layer 314.

The first substrate 311 of the display unit 300 is stacked on the second substrate 312, and the second substrate 312 of the display unit 300 is formed to face the first substrate 311 in a length longer than that of the first substrate 311.

An image display layer such as a liquid crystal layer or a light emitting layer is interposed between the first substrate 311 and the second substrate 312, thereby displaying an image.

The first touch detection layer 313 is formed on the first substrate 311 so as to detect a touch signal.

To the first touch detection layer 313, connected is a first signal transmitting unit 316 configured to transmit a touch signal detected by the first touch detection layer 313 to a touch IC. The touch IC may be integrally formed at the driver IC.

To the second substrate 312, connected is a third signal transmitting unit 317 configured to transmit a signal generated from the display panel 310 to the touch IC, or to transmit a signal to the display panel 310.

The first signal transmitting unit 316 or the third signal transmitting unit 317 may be implemented as a Flexible Printed Circuit Board (FPCB).

The upper polarizing layer 314 is formed on the first touch detection layer 313 so as to enhance brightness of the display panel 310.

The display unit 300 and the window 200 are bonded to each other in a state that an adhesive layer 350 is interposed therebetween.

As the first touch detection layer 313 is formed on the first substrate 311 disposed in the display panel 310, the display unit 300 may display an image and may perform a touch detection function.

Besides, as the touch detection layer is formed in the display panel 310 without an additional touch detection layer, the display unit 300 may have a thin thickness.

The driver IC 320 is mounted on the second substrate 312 of the display unit 300.

The driver IC 320 is formed to face the touch key forming region 221 of the window 200 when the display unit 300 is mounted on the terminal bodies 101 and 102.

More specifically, the driver IC 320 is mounted on a part of the second substrate 312 protruding from the first substrate 311, and the driver IC 320 faces the touch key forming region 221 of the window 200.

The driver IC 320 may be configured to generate a signal for displaying an image on the display panel 310, and may be implemented as an IC chip.

The driver IC 320 may be covered with a sealant (not shown) configured to protect and fix the driver IC 320.

The second touch detection layer 400 is spaced from one surface of the display region 210 of the window 200 in a length direction, and is formed on the touch key forming region 221 of the window 200 facing the driver IC 320. When a user presses the touch key forming region 221, the second touch detection layer 400 detects a touch signal.

That is, the second touch detection layer 400 is to implement a touch key separately from the first touch detection layer 313. On the touch key forming region 221 of the window 200, formed is an electrode pattern operating as a capacitance type touch sensor by printing or deposition/etching processes, etc.

Due to several tens of micrometers (about 10 μm) or less than, the electrode pattern of the second touch detection layer 400 may be implemented in a space of an upper end of the driver IC 320, the space having a size more than several hundreds of micrometers.

As the touch key is implemented in the space, the mobile terminal may have a small size. Furthermore, this may simplify a structure for implementing the touch key.

A user may perform a manipulation command by pressing the touch key forming region 221, thereby variously manipulating the mobile terminal.

To the second touch detection layer 400, connected is a second signal transmitting unit 410 configured to transmit a signal detected by the second touch detection layer 400 to the touch IC.

The second signal transmitting unit 410 may be connected to the second touch detection layer 400 by having an anisotropic conductive material (e.g., anisotropic conducive film (ACF)) thereon.

The second signal transmitting unit 410 may be implemented as an FPCB (Flexible Printed Circuit Board).

The first signal transmitting unit 316, the second signal transmitting unit 410 and the third signal transmitting unit 317 may be connected to a main board (not shown) separately, or in a manner that at least two signal transmitting units are integrated with each other.

Here, the first to third signal transmitting units may be connected to the main board by a connector or by soldering.

Under this configuration, the touch key forming region is arranged near the display region 210 of the window 200 with using the display panel 310 integrated with the touch detection layer. This may minimize a mounting space inside the mobile terminal, and may implement an enhanced design of the mobile terminal.

Figure 9:
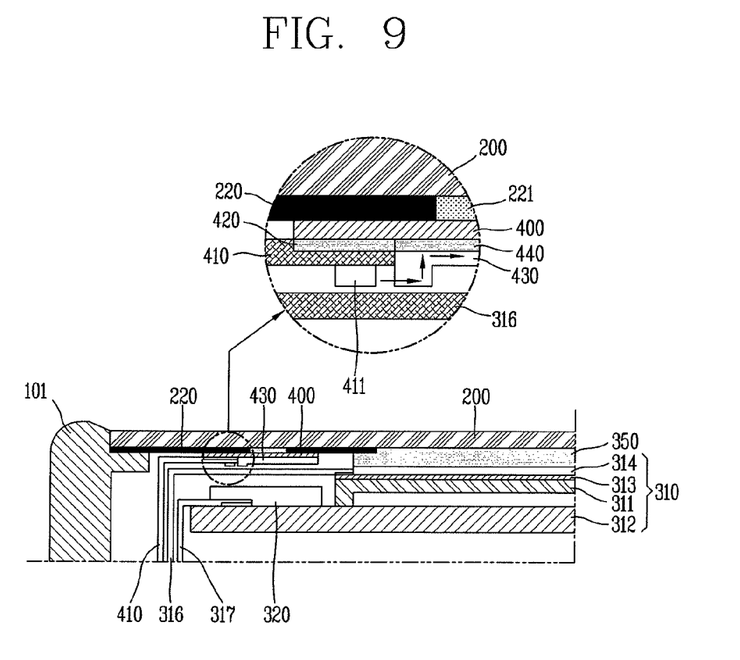
FIGS. 9 to 11 are sectional view illustrating another example of a sectional surface taken along line 'A-A' in FIG. 5.
Figure 10:
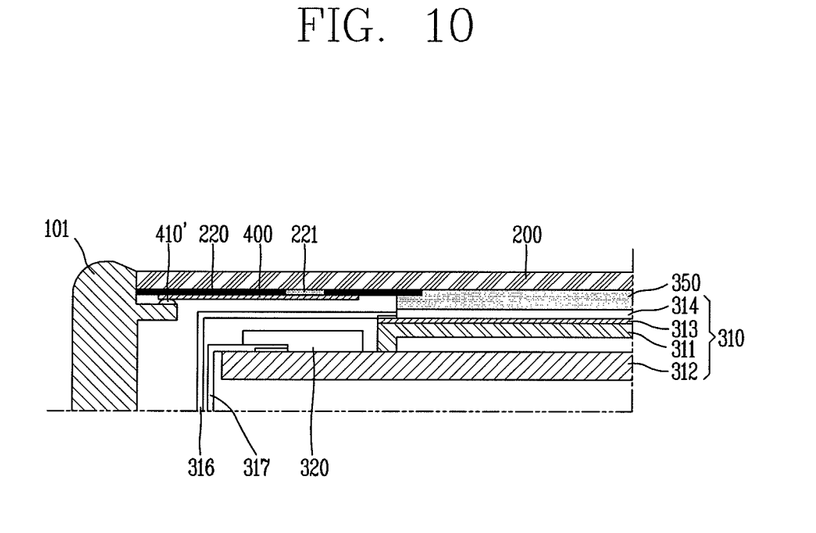
Figure 11:
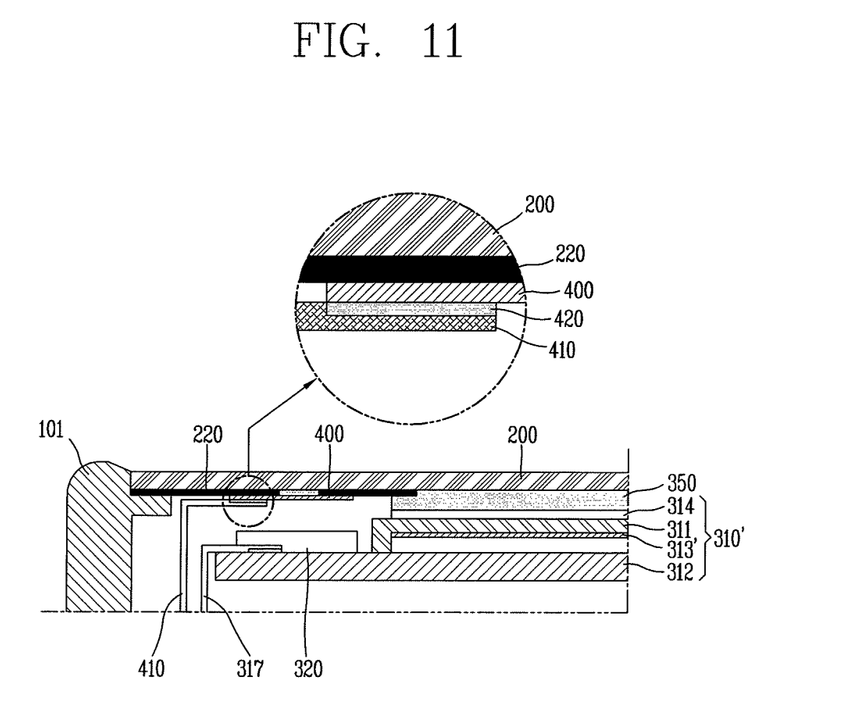

FIGS. 9 to 11 are sectional view illustrating another example of a sectional surface taken along line 'A-A' in FIG. 5.

The same components as those of the aforementioned embodiment will be provided with the same reference numerals, and detailed explanations thereof will be omitted.

Referring to FIG. 9, this embodiment is based on the configuration of FIG. 6. In this embodiment, a light emitting device 411 is mounted on the second signal transmitting unit 410, and a light guiding layer 430 is formed on the second touch detection layer 400.

The light guiding layer 430 is configured to transmit light generated from the light emitting device 411 to the touch key forming region 221.

More specifically, the light guiding layer 430 is formed by connecting a second signal detecting unit to one region of the second touch detection layer 400, and by forming an adhesive layer 440 on another region of the second touch detection layer 400.

As the light emitting device 411 and the light guiding layer 430 are further provided, the touch key forming region 221 may have a lighting effect.

Referring to FIG. 10, this embodiment is based on the configuration of FIG. 6 except that the second signal transmitting unit 410 is configured in a different manner.

In this embodiment, the second signal transmitting unit 410' is implemented as contact electrodes formed at the terminal bodies 101 and 102 and electrically connected to a main board (not shown). More specifically, the second signal transmitting unit 410' is implemented as contact electrodes inserted into the case. Through the contact electrode, a signal detected by the second touch detection layer 400 is transmitted. Here, the signal is transmitted to a main board (not shown) via a flexible printed circuit board (FPCB), etc.

Referring to FIG. 11, this embodiment is based on the configuration of FIG. 6 except that the display unit 300 is configured in a different manner.

Referring to FIG. 11, the display unit 300 includes a first substrate 311, a second substrate 312, a first touch detection layer 313 and an upper polarizing layer 314. The first touch detection layer 313 is formed between the first substrate 311 and the second substrate 312.

That is, the first touch detection layer 313 is formed as a separate layer from a liquid crystal layer or a light emitting layer formed between the first substrate 311 and the second substrate 312.

As the first touch detection layer 313 is formed between the first substrate 311 and the second substrate 312, the display unit 300 may have a thin thickness.

The second touch detection layer 400 is formed in a thickness of about 10 μm. Therefore, even if the second touch detection layer 400 is formed at the window 200 facing the driver IC 320, interference does not occur between the second touch detection layer 400 and the driver IC 320.

In this case, a function of a first signal transmitting unit 316 which transmits a touch signal of the first touch detection layer 313 may be performed by a third signal transmitting unit 317. The first signal transmitting unit 316 may be directly connected to the first touch detection layer 313 formed between the first substrate 311 and the second substrate 312.

Figure 12:
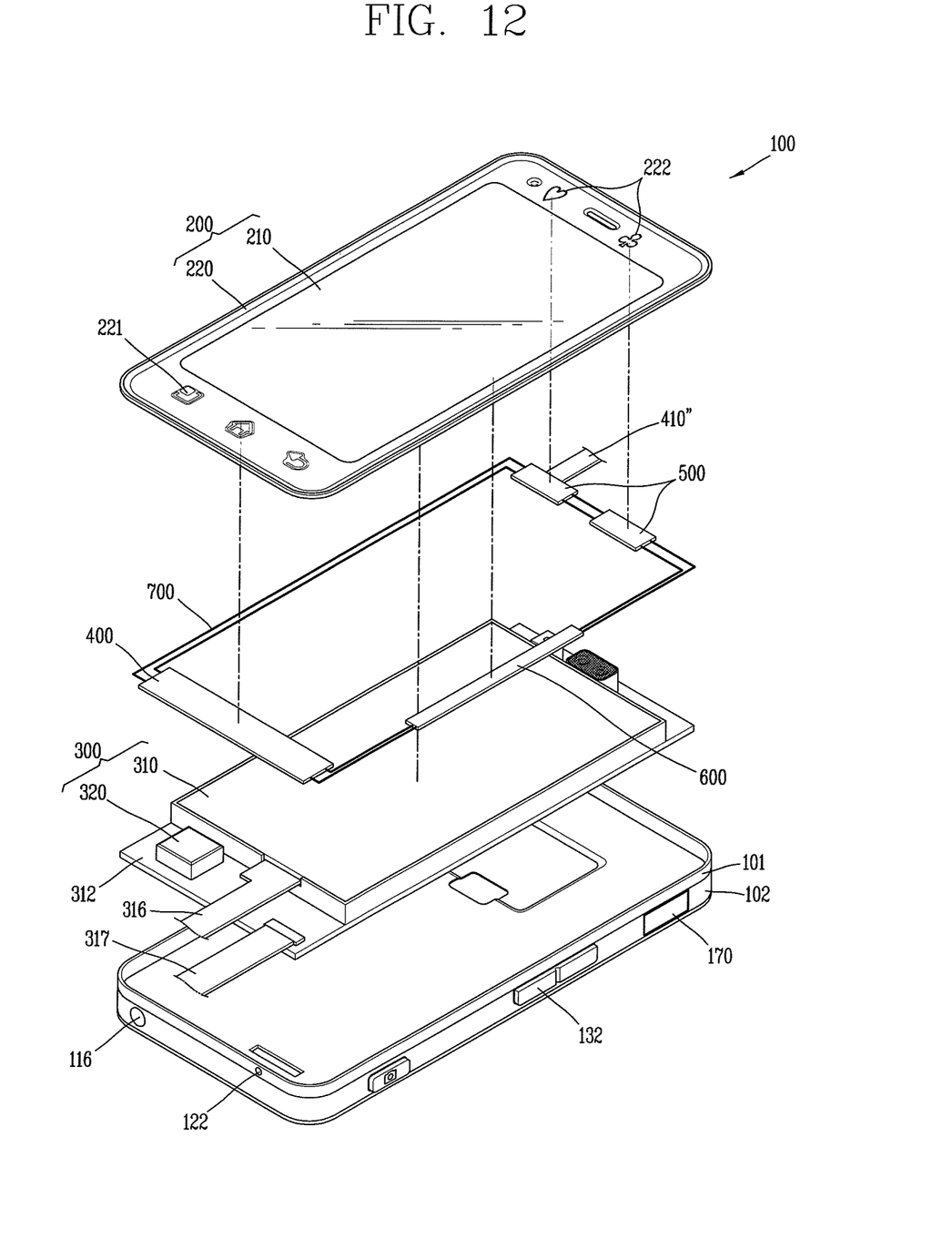
FIG. 12 is an exploded perspective view of the mobile terminal of FIG. 2.
Figure 13:
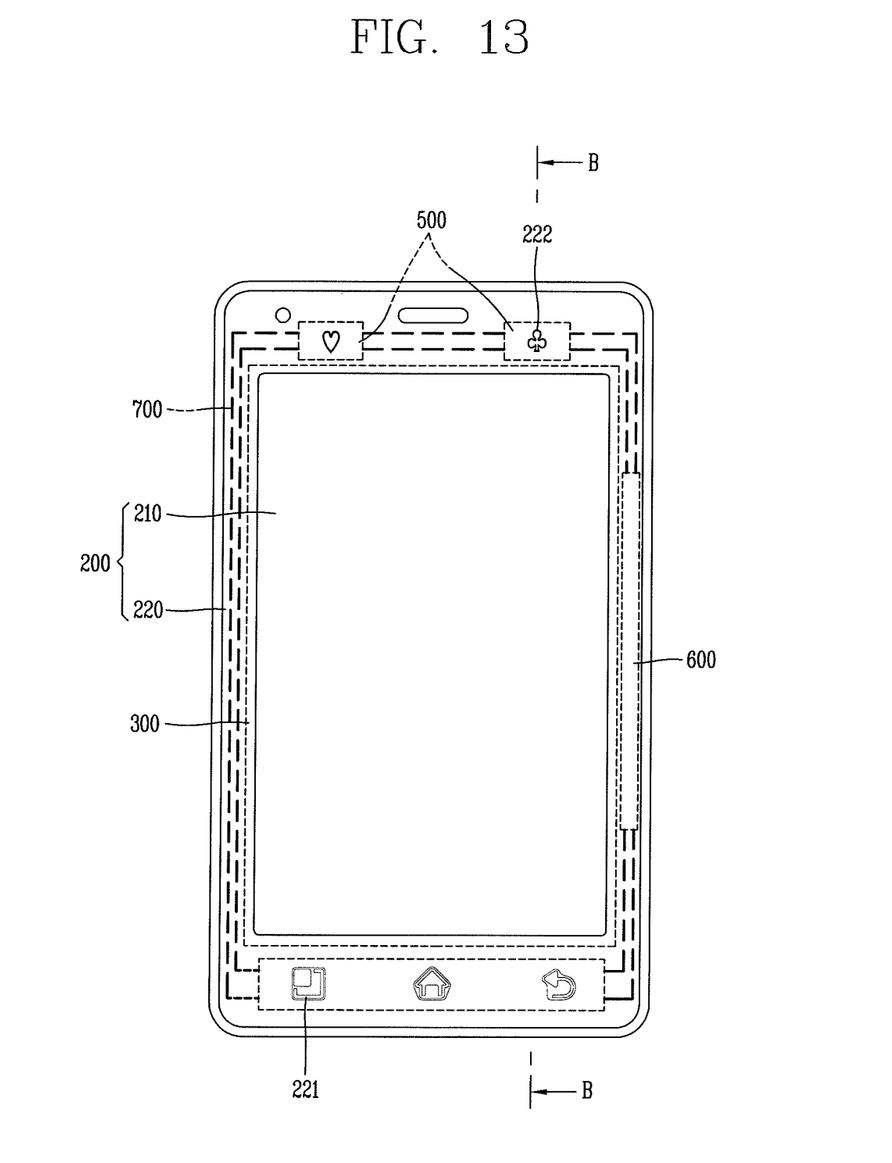
FIG. 13 is a planar view of the mobile terminal of FIG. 12.
Figure 14:
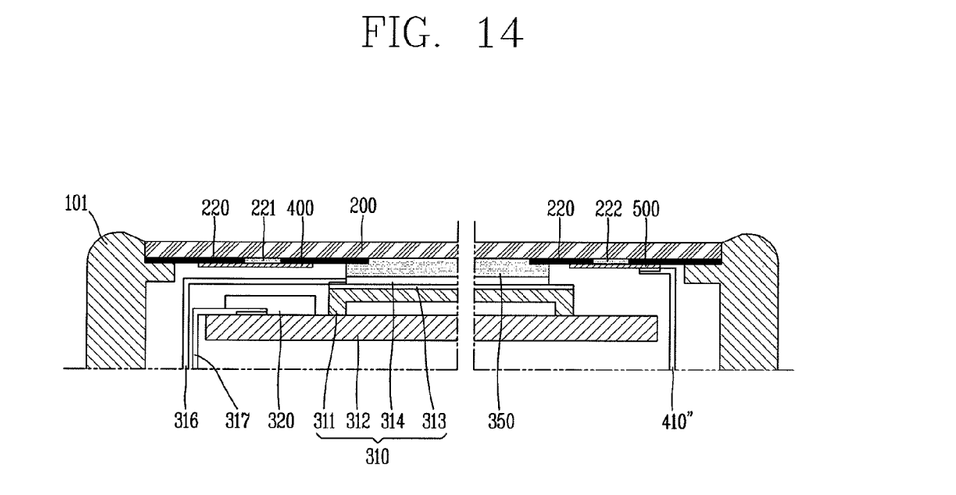
FIGS. 14 and 15 are sectional views illustrating one example of a sectional surface taken along line 'B-B' in FIG. 13.
Figure 15:
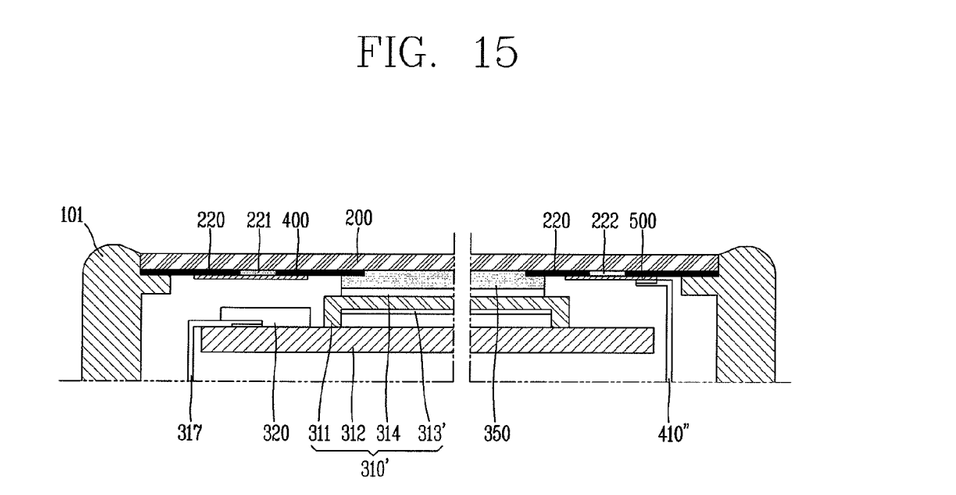

FIG. 12 is an exploded perspective view of the mobile terminal similar to the mobile terminal of FIG. 2, FIG. 13 is a planar view of the mobile terminal of FIG. 12, and FIGS. 14 and 15 are sectional views illustrating examples of a sectional surface taken along line 'B-B' in FIG. 13.

The arrangement of this embodiment is similar to that of FIG. 4. In this embodiment, a third touch detection layer 500 and a fourth touch detection layer 600 are further provided besides the second touch detection layer 400. The second to fourth touch detection layers are connected to one another by a routing electrode 700.

The second touch detection layer 400 is spacing from one surface of the display region 210 of the window 200 in a length direction, and the third touch detection layer 500 is spaced from another surface of the display region 210 of the window 200 in a length direction. And, the fourth touch detection layer 600 is spaced from one surface of the display region 210 of the window 200 in a width direction.

The second touch detection layer 400, the third touch detection layer 500 and the fourth touch detection layer 600 are electrically connected to one another by the routing electrode 700 formed at a print region 220 of the window 200.

Part of the print region 220 of the window 200 may be formed as a touch key forming region 221 having a specific shape such as a decorative pattern or style, and the touch key forming region 221 may be used as a touch key.

The touch key forming region 221 is spaced from each surface of the display region 210 of the window 200 in a length direction, and spacing from one surface of the display region 210 in a width direction.

The second touch detection layer 400, the third touch detection layer 500 and the fourth touch detection layer 600 are formed on the touch key forming region 221 of the window 200, respectively, and detect a touch signal generated when a user presses the touch key forming region 221.

Here, the third touch detection layer 500 may operate as a hot key, and the fourth touch detection layer 600 may operate as a scroll key.

To the third touch detection layer 500, connected is a second signal transmitting unit 410'' configured to transmit a touch signal detected by the second touch detection layer 400, the third touch detection layer 500 and the fourth touch detection layer 600 to the main board.

Descriptions about other components are the same as those aforementioned in FIG. 4.

FIG. 15 is a sectional view illustrating another example of a sectional surface taken along line 'B-B' in FIG. 13.

The same components as those of the aforementioned embodiment will be provided with the same reference numerals, and detailed explanations thereof will be omitted.

Referring to FIGS. 13 and 15, the display unit 300 is configured in a different manner from that of FIG. 12.

The display unit 300 includes a first substrate 311, a second substrate 312, a first touch detection layer 313 and an upper polarizing layer 314. The first touch detection layer 313 is formed between the first substrate 311 and the second substrate 312.

That is, the first touch detection layer 313 is formed as a separate layer from a liquid crystal layer or a light emitting layer formed between the first substrate 311 and the second substrate 312.

As the first touch detection layer 313 is formed between the first substrate 311 and the second substrate 312, the display unit 300 may have a thin thickness.

The second touch detection layer 400 is formed in a thickness of about 10 μm. Therefore, even if the second touch detection layer 400 is formed at the window 200 facing the driver IC 320, interference does not occur between the second touch detection layer 400 and the driver IC 320.

In this case, a function of a first signal transmitting unit 316 which transmits a touch signal of the first touch detection layer 313 may be performed by a third signal transmitting unit 317. The first signal transmitting unit 316 may be directly connected to the first touch detection layer 313 formed between the first substrate 311 and the second substrate 312.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mobile terminal, comprising:
a terminal body;
a window coupled to the terminal body, the window having a display region for displaying an image and a print region located around the display region;
a display unit located in the terminal body, the display unit including:
a display panel, at least a part of the display panel being located below the display region;
a first touch detection layer, at least a part of the first touch detection layer being located below the display region; and
a driver integrated circuit (IC) located below the print region of the window; and
a second touch detection layer configured to detect a touch signal, the second touch detection layer located at the print region of the window, and the second touch detection layer facing the driver IC,
wherein the window is configured to cover the display unit.

2. The mobile terminal of claim 1, wherein the display unit includes:
a first substrate; and
a second substrate facing the first substrate, the second substrate formed to be longer than the first substrate,
wherein the driver IC is mounted on the second substrate, and
wherein the first touch detection layer is formed on the first substrate.

3. The mobile terminal of claim 2, further comprising a first signal transmitting unit connected to the first touch detection layer, the first signal transmitting unit being configured to transmit a touch signal detected by the first touch detection layer.

4. The mobile terminal of claim 3, further comprising a second signal transmitting unit connected to the second touch detection layer, the second signal transmitting unit configured to transmit a touch signal detected by the second touch detection layer.

5. The mobile terminal of claim 4, further comprising a third signal transmitting unit connected to the second substrate, the third signal transmitting unit configured to transmit a signal generated from the display panel or to transmit a signal to the display panel.

6. The mobile terminal of claim 5, wherein at least one of the first, second, and third signal transmitting units includes a flexible printed circuit board.

7. The mobile terminal of claim 6, wherein the second signal transmitting unit includes a connecting electrode formed at the terminal body, the second signal transmitting unit being electrically connected to a main board.

8. The mobile terminal of claim 6, wherein the first, second, and third signal transmitting units are connected to a main board separately at least two of the first, second, and third signal transmitting units are integrated with each other.

9. The mobile terminal of claim 6, wherein the first, second, and third signal transmitting units are connected to a main board by a connector or by soldering.

10. The mobile terminal of claim 1, wherein the display unit includes:
a first substrate; and
a second substrate facing the first substrate, the second substrate formed to be longer than the first substrate,
wherein the driver IC is mounted on the second substrate, and
wherein the first touch detection layer is formed between the first and second substrates.

11. The mobile terminal of claim 1, wherein part of the print region of the window defines a touch key forming region having a specific shape, and the second touch detection layer is located at the touch key forming region.

12. The mobile terminal of claim 11, further comprising:
a light emitting device mounted to the second signal transmitting unit; and
a light guiding layer formed on the second touch detection layer, the light guiding layer configured to transmit light generated from the light emitting device to the touch key forming region.

13. The mobile terminal of claim 11, wherein the second touch detection layer is spaced from one end of the display region of the window in a length direction of the mobile terminal.

14. The mobile terminal of claim 13, further comprising a third touch detection layer electrically connected to the second touch detection layer, the third touch detection layer being spaced from another end of the display region of the window in a length direction of the mobile terminal.

15. The mobile terminal of claim 14, wherein the third touch detection layer functions as a hot key.

16. The mobile terminal of claim 14, further comprising a fourth touch detection layer electrically connected to the second touch detection layer, the fourth touch detection layer being spaced from one side of the display region of the window in a width direction of the mobile terminal.

17. The mobile terminal of claim 16, wherein the fourth touch detection layer functions as a scroll key.

18. The mobile terminal of claim 16, further comprising a second signal transmitting unit connected to the third touch detection layer, the second signal transmitting unit being configured to transmit a touch signal detected by at least one of the second, third, and fourth touch detection layers.

19. The mobile terminal of claim 16, wherein the second, third, and fourth touch detection layers are electrically connected to one another by a routing electrode located at the print region of the window.

20. The mobile terminal of claim 1, wherein the display panel includes an image display layer configured to display an image, and
wherein the first touch detection layer is configured to detect a user's touch.

* * * * *